UNITED STATES PATENT OFFICE.

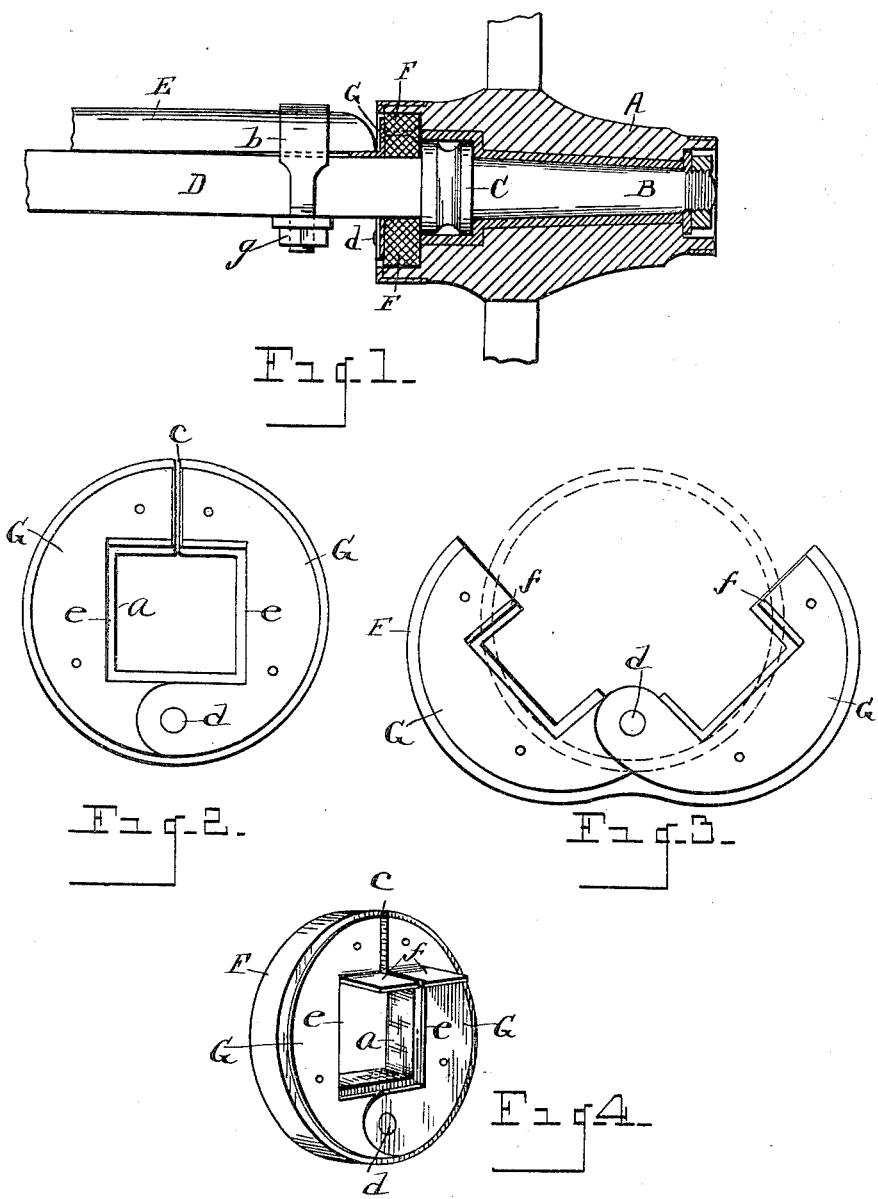

ARTHUR E. MOORE, OF HOWARD, MICHIGAN.

DIRT AND SAND EXCLUDING WASHER FOR VEHICLE-WHEELS.

SPECIFICATION forming part of Letters Patent No. 649,741, dated May 15, 1900.

Application filed December 26, 1899. Serial No. 741,699. (No model.)

*To all whom it may concern:*

Be it known that I, ARTHUR E. MOORE, a citizen of the United States, residing at Howard township, in the county of Cass, State of Michigan, have invented certain new and useful Improvements in Dirt and Sand Excluding Washers for Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to dirt and sand excluding washers for vehicle-wheels; and it consists in the construction and arrangement of parts hereinafter fully set forth, and pointed out particularly in the claims.

The objects of the invention are to provide simple and efficient means for excluding dirt and sand from the journal of vehicle-wheels in the form of a jointed washer, in which the arrangement is such as to enable the diameter of the washer to be varied to accommodate any variation in the inner diameter of the recess within the sand-band at the inner end of the hub, to permit of said washer being readily placed upon the axle and easily removed when desired, and to enable the washer to be securely retained in place by the clamping of its projecting tongues between the steel and wooden portions of the axle. These objects are attained by the construction of parts illustrated in the accompanying drawings, in which—

Figure 1 is a sectional view through a hub of a wheel having my improved washer therein, the axle appearing in elevation. Fig. 2 is an enlarged elevation of the metallic face of the washer. Fig. 3 is a like view showing the jointed sections of the washer swung apart upon their uniting-pivot. Fig. 4 is a perspective view of the washer closed.

Referring to the letters of reference, A designates a vehicle-wheel hub of the ordinary construction, in which the end B of the axle is journaled.

C is a collar upon the axle which lies within the hub.

D is the main portion of the steel axle.

E is the wooden portion of the axle, mounted upon the steel portion and secured by suitable clips $b$.

The dirt-excluding washer comprises a circular felt disk F, having a central rectangular aperture $a$ therethrough and provided with a diametrical slot $c$, extending through the washer into said aperture. This felt washer is securely mounted upon two semicircular plates G, pivoted together at their lower meeting edges, as shown at $d$, and having registering rectangular openings $e$ in their inner margins, which when said plates are brought together are adapted to embrace the square of the axle.

This improved washer is adapted to be placed upon the axle within the sand-band at the inner end of the hub, with its felt face F innermost. It is calculated that the diameter of the felt portion of the washer shall be sufficient to snugly fill the recess within the hub; but should said washer fail to perfectly fill said recess its diameter may be increased by swinging the plates G outwardly upon their pivots or decreased by closing said plates together, thereby enabling the washer to be perfectly fitted within the hub. It will be observed that the margin of the felt washer projects somewhat beyond the edges of the plates G, so that the felt portion of the washer only is brought into contact with the wall of the recess in the inner end of the hub. The same is true in regard to the central opening through the plates G of the washer, so that there may be some lateral movement between the axle and hub without bringing the edges of the metal plates into contact with either the hub or axle.

To secure the washer in place upon the axle, the jointed plates G are provided with the laterally-projecting tongues $f$, struck from the metal of said plates and adapted to enter between the steel portion D and the wooden portion E of the axle and being confined in place by means of the clip $b$, which embraces and unites said parts.

The washer may be readily mounted upon the axle by loosening the nut $g$ of the clip and closing the washer around the axle, so that the tongues $f$ thereof will enter between the steel and wooden portions of the axle, as shown in Fig. 1, when by tightening said nut $g$ the washer may be securely clamped in place. To remove the washer, the nut $g$ on the clip is loosened, so as to relieve the tongues $f$, when the washer may be opened, as shown in Fig. 3, and removed from the axle.

It will be seen that this device is very simple and inexpensive, that it may be readily attached to an axle and easily removed therefrom, and that when properly in place will serve to effectually exclude sand and dirt from the journal of the wheel.

Having thus fully set forth this invention, what is claimed is—

1. The combination of the axle and wheel-hub, said hub having a recess in the end thereof, a washer adapted to fill said recess comprising two semicircular plates hinged together having two integral tongues projecting laterally therefrom and adapted to engage the axle, a felt disk mounted upon the inner face of said plates and having a central opening adapted to receive the axle, and a slot extending diametrically through the rim of said washer into said aperture.

2. A combination of the two-part axle, the wheel-hub mounted thereon, said hub having a recess in the end thereof, a split felt washer having a central aperture adapted to receive the axle, said washer lying within the recess in said hub, two semicircular plates mounted upon said washer and pivoted together, said plates having a central aperture which receives the axle, and provided with projecting tongues adapted to lie between the two parts of said axle, and a clip for clamping the axle together upon said tongues.

In testimony whereof I sign this specification in the presence of two witnesses.

ARTHUR E. MOORE.

Witnesses:
CHARLES E. WHITE,
T. C. HOUSE.